United States Patent [19]

Pelchat et al.

[11] 4,264,908
[45] Apr. 28, 1981

[54] ADAPTIVE POLARIZATION SEPARATION

[76] Inventors: Robert A. Frosch, Administrator of the National Aeronautics and Space Administration, with respect to an invention of Guy M. Pelchat, Indialantic, Fla.; George G. Rassweiler, Indialantic, Fla.; Anthony J. Gianatasio, Indialantic, Fla.; Lock R. Young, Palm Bay, Fla.

[21] Appl. No.: 17,887

[22] Filed: Mar. 6, 1979

[51] Int. Cl.³ .................. H04B 7/00; H01Q 15/24
[52] U.S. Cl. ........................................... 343/100 PE
[58] Field of Search ................................. 343/100 PE

[56] References Cited

U.S. PATENT DOCUMENTS

| | | | |
|---|---|---|---|
| 3,849,781 | 11/1974 | Ort | 343/100 PE X |
| 3,943,517 | 3/1976 | Vogt | 343/100 PE |
| 4,090,137 | 5/1978 | Soma et al. | 343/100 PE X |
| 4,105,977 | 8/1978 | Fitting et al. | 343/100 PE X |
| 4,106,015 | 8/1978 | Beguin et al. | 343/100 PE X |
| 4,112,370 | 9/1978 | Monsen | 343/100 PE X |

*Primary Examiner*—T. H. Tubbesing
*Attorney, Agent, or Firm*—William H. King; John R. Manning; Howard J. Osborn

[57] ABSTRACT

A broadband adaptively controlled polarization separation network. Two transmitted signals vertically and horizontally polarized are received as elleptically polarized signals. One of the two received elliptically polarized signals is automatically adjusted to make it linear and thereafter automatically adjusted to make it vertical. If the other signal does not have any vertical polarization on it then the two signals are easily separated and nothing else is needed. However, if there is any vertical polarization on the other signal this invention provides for separating the resulting crosstalk between the two signals. This is done automatically by the use of two sets of crosscouplers which couple a single line to the other line to complete the polarization decoupling operation.

3 Claims, 3 Drawing Figures

ADAPTIVE POLARIZATION SEPARATION

ORIGIN OF THE INVENTION

The invention described herein was made in the performance of work under a NASA Contract and is subject to the provisions of section 305 of the National Aeronautics and Space Act of 1958, Public Law 85-568 (72 Stat. 435; 42 USC 2457).

BACKGROUND OF THE INVENTION

The invention relates generally to communication systems and more specifically concerns a technique for increasing the data capacity of communication systems.

It is reasonable to expect that future communication systems will be allegated only a very limited spectrum in desirable frequency bands, while bandwidths of signals will be increasing. Several approaches, such as more efficient analog-to-digital conversion, more efficient modulation techniques, and dual polarization can be used to increase the data capacity of the available spectrums. This invention relates to the dual polarization technique for increasing the data capacity.

With the technique of dual polarization, different channels are established for each of two orthogonal polarizations transmitted. Obviously, if the two polarizations can be separated sufficiently, the effective data capacity for a given bandwidth is doubled. However, in a typical communication system, the received polarizations are rarely completely separated due to cross polarization crosstalk from various sources such as rain, nonperfect antennas, and ionospheric propagation. The presence of crosstalk will cause some degradation of the channel capacity of a communication system and thus, it may have to be reduced to a lower level for full potential of dual polarization to be realized. This reduction can be done with a cross polarization correction network.

In order to achieve a polarization correction network, in the face of varying cross polarization (due to such factors as varying rain), the correction network should be automatic or adaptive so as to track the varying cross polarization. The past dual polarization correction networks require a general search optimization algorithm and do not have a direct analog control.

It is therefore the primary purpose of this invention to provide a dual polarization correction network that is automatic or adaptive so as to track the varying cross polarization.

It is another object of this invention to provide a direct analog controlled dual polarization correction network.

Other objects and advantages of this invention will become apparent hereinafter in the specifications and drawings.

SUMMARY OF THE INVENTION

The invention includes three sections: a lossless phase shift section, an orthogonalization section, and an analog automatic control section. The lossless phase shift section includes a rotatable 90° differential phase shifter which changes one of the received elliptical polarized signals to a linear polarized signal. This linear polarized signal is adjusted to vertical polarization by means of a rotatable 180° differential phase shifter. An orthomode transducer then separates the two polarized signals into their respective channels with the vertical linear polarized signal in one channel and an elliptical polarized signal in the other channel.

The orthogonalization section comprises two sets of crosscouplers. Each set of crosscouplers includes two mechanically ganged variable directional couplers that are connected together electrically. One set of couplers cancels the inphase crosstalk and the other set, which includes a 90° phase shifter, cancels the quadrature crosstalk. The analog automatic control section includes means for detecting two different frequency CW tones that are included with the two received or transmitted signals and correlates these detected CW tones to form control signals which control the rotatable 90° differential phase shifter and the rotatable 180° differential phase shifter in the lossless phase shifter section and which controls the two sets of crosscouplers in the orthogonalization section.

DETAILED DESCRIPTION OF THE INVENTION

Figure 1:
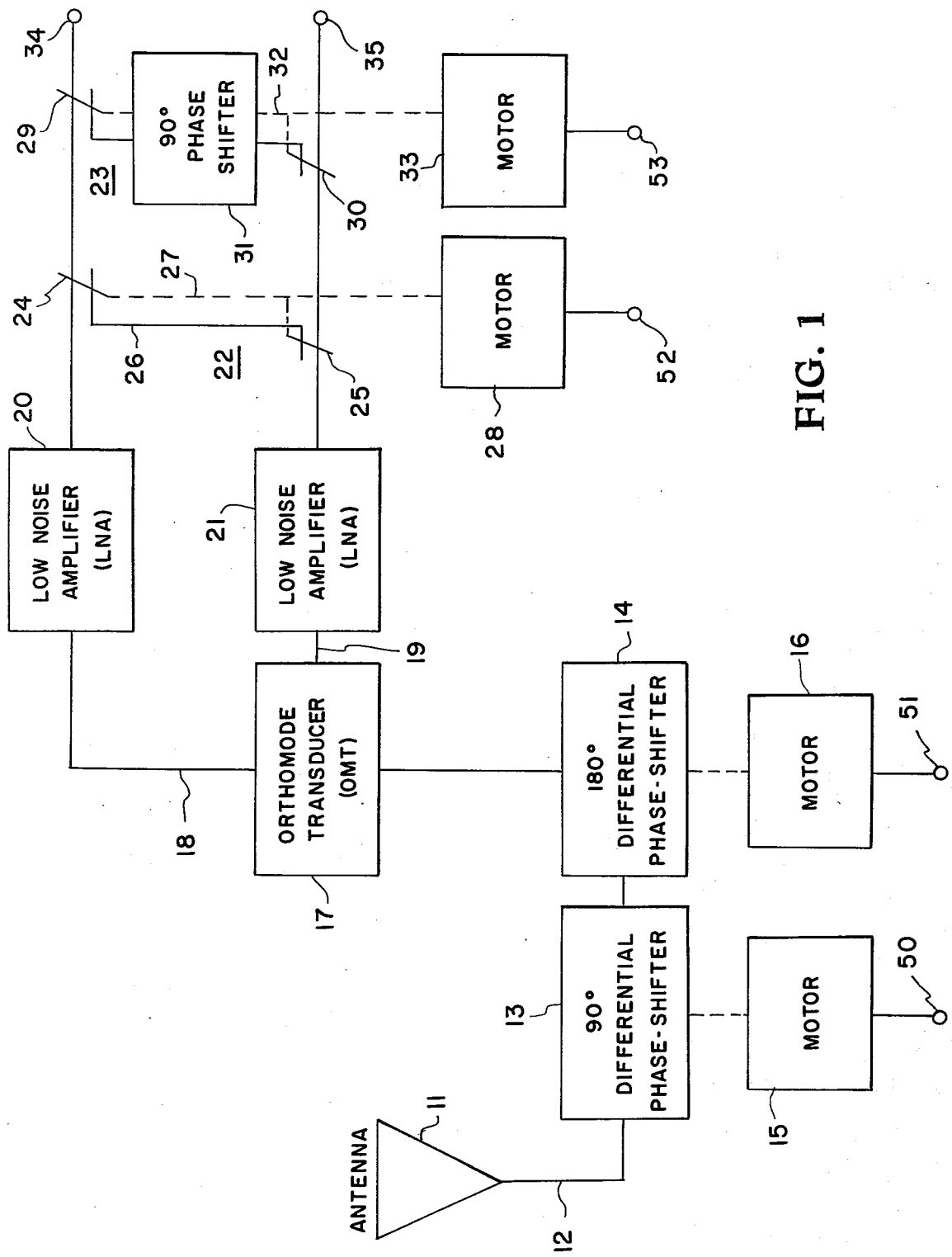
FIGS. 1 and 3 together show a block diagram of the embodiment of the invention selected for illustration in the drawings.

Turning now to the embodiment of the invention selected for illustration in the drawings the number 11 designates the receiving antenna. The transmitted signals are $s_1$ vertically polarized and $s_2$ horizontally polarized. The signals $s_1$ and $s_2$ contain CW tones at frequencies $f_1$ and $f_2$, respectively. Ideally, the received signals $s_1$ and $s_2$ are linearly polarized with $s_1$ vertical and $s_2$ horizontal. However, they are elliptically polarized signals as shown in diagram a of FIG. 2. The received signals are applied to a circular waveguide 12 which includes a rotatable 90° differential phase shifter 13 and a rotatable 180° differential phase shifter 14. Rotatable phase shifter 13 is controlled by a motor 15 to make the signal $s_1$ linear polarized at the output of the phase shifter as shown in diagram b of FIG. 2. A less than 90° phase shifter can be used in place of phase shifter 13 if the ranges of polarization coupling is constrained; a smaller phase shift is desirable for wide band operation. Differential phase shifter 14 is adjusted by a motor 16 to make the signal $s_1$ vertically polarized at the output of phase shifter 14 as shown in diagram c of FIG. 2.

The output of rotatable phase shifter 14 is applied to an orthomode transducer 17 which has its two outputs connected to rectangular waveguides 18 and 19. Orthomode transducer 17 has the property of passing the vertical polarization to waveguide 18 and the horizontal polarization to waveguide 19. The resulting signals $e_{18}$ and $e_{19}$ in the rectangular waveguides 18 and 19, respectively are:

$$e_{18} = s_1 + \mu s_2$$

$$e_{19} = (1-|\mu|^2)^{\frac{1}{2}} s_2$$

where $\mu$ is related to the vertical component of $s_2$. The two signals $e_{18}$ and $e_{19}$ are applied to a low noise amplifier 20 and a low noise amplifier 21, respectively.

Figure 2:
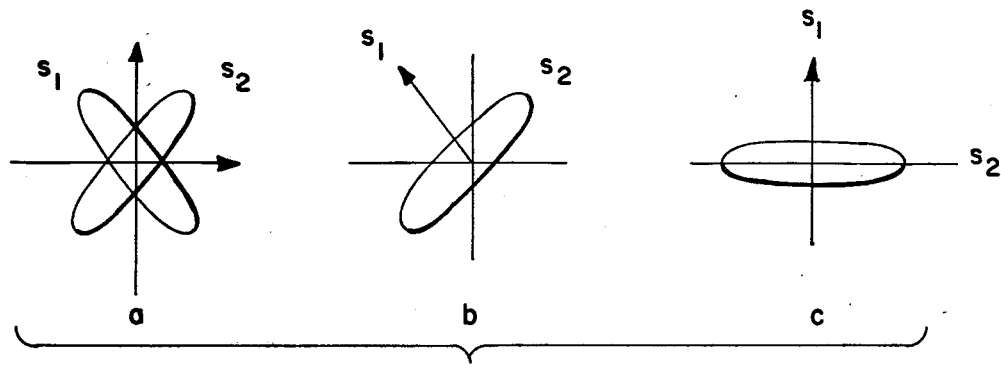
FIG. 2 shows the polarization of the two received signals at different locations in the circuit.

If the signal $s_2$ as shown in diagram c of FIG. 2 has no vertical component, $\mu$ is equal to zero and there is no crosstalk between $s_1$ and $s_2$. If $s_2$ has a vertical component, $\mu$ is not equal to zero and there is residual crosstalk between the two signals. To eliminate this residual crosstalk, two sets of crosscouplers 22 and 23 are provided. A set of crosscouplers 22 which cancel the inphase crosstalks includes variable directional couplers 24 and 25. These two directonal couplers are connected together electrically by a connector 26 and are mechanically ganged by a linkage 27 which is controlled by a motor 28. A set of crosscouplers 23 which cancels the quadrature crosstalk includes variable directional couplers 29 and 30. These two directional couplers are connected together electrically through a 90° phase shifter 31 and are mechanically ganged by a linkage 32 which is controlled by a motor 33. The resulting separated signals appear on output terminals 34 and 35.

A set of crosscouplers consist of two mechanically ganged variable directional couplers. Such a crosscoupler is usually implemented with a pair of orthomode transducers separated by a polarization rotator. With this arrangement, the coupling coefficient is sin 2 $\theta$ where $\theta$ is the mechanical alignment of the polarization rotator. This approach is capable of giving good cancellation over wide bandwidths with low incidental losses, an important consideration if sufficiently well matched low noise amplifiers are not available. With high gain, low noise amplifiers, it is possible to obtain good performance with couplers 24 and 30 fixed at 3 dB.

Figure 3:
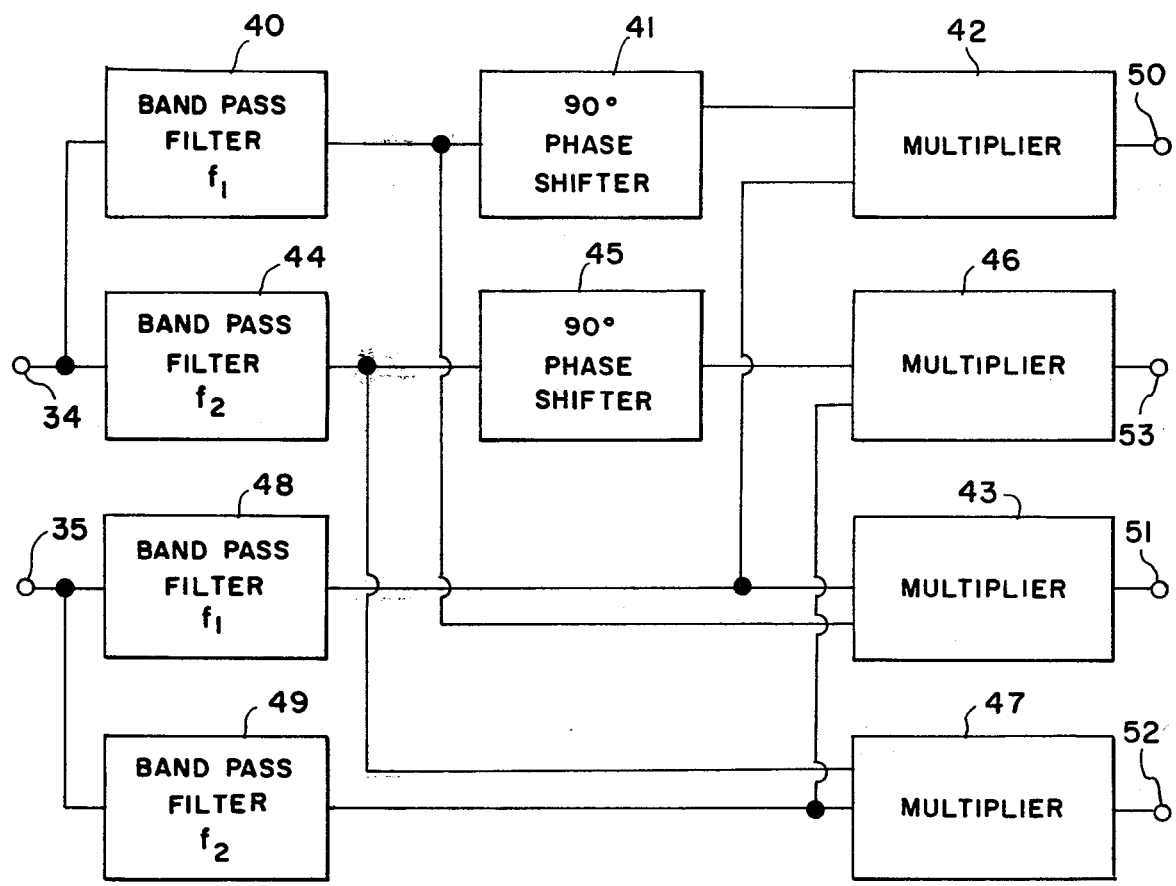

In the analog control system shown in FIG. 3, the signal at output terminal 34 is applied to an $f_1$ bandpass filter 40 whose output is applied directly to a multiplier 43 and through a 90° phase shifter 41 to a multiplier 42. The output signal at output terminal 34 is also applied to an $f_2$ bandpass filter 42 whose output is applied directly to a multiplier 47 and through a 90° phase shifter 45 to a multiplier 46. The output signal at output terminal 35 is applied to an $f_1$ bandpass filter 48 whose output is applied directly to multipliers 42 and 43. The signal at output terminal 35 is also applied to an $f_2$ bandpass filter 49 whose output is applied directly to multipliers 46 and 47. The output of multiplier 42 at terminal 50 is applied to motor 15 in FIG. 1 to control the rotatable 90° differential phase shifter 13. The output of multiplier 43 at terminal 51 is applied to motor 16 to control the rotatable 180° differential phase shifter 14. The output of multiplier 47 at terminal 52 is applied to motor 28 to control the set of crosscouplers 22 and the output of multiplier 46 at terminal 53 is applied to motor 33 to control the set of crosscouplers 23.

The output of multiplier 42 is the quadrature correlation signal measured on $s_1$ and is integrated by motor 15 to provide the control for phase shifter 13 to make the received signal $s_1$ linear as shown in diagram b of FIG. 2. The output of multiplier 43 is the inphase correlation voltage measured on $s_1$ and is integrated by motor 16 to provide the control for phase shifter 14. The output of multiplier 47 is the inphase correlation measured on $s_2$ and is integrated by motor 28 to provide the control for the set of crosscouplers 22. The output of multiplier 46 is the quadrature correlation voltage measured on $s_2$ and is integrated by motor 33 to provide the control for the set of crosscouplers 23.

The control of phase shifter 13 is independent of the control of phase shifter 14 and is almost independent of the settings of the sets of crosscouplers 22 and 23 for all input polarizations. The control on phase shifter 14 is almost independent of all other controls as long as the other control variables are close to their desired value.

The advantages of this invention are that it provides direct analog correlation circuit control; it minimizes mutual coupling between the four control loops; it employs rotatable but electrically fixed waveguide phase shifters; it adjusts to make one polarization linear; it adjusts to completely eliminate the crosstalk for one of the signals; and it requires signal coupling from a single line to the other line to complete the polarization decoupling operation.

What is claimed is:
1. A broadband adaptively controlled polarization separation network comprising:
   an antenna for receiving two incoming signals $s_1$ and $s_2$ that were transmitted on vertical and horizontal polarizations, respectively, with the signals $s_1$ and $s_2$ containing new CW tones at frequencies $f_1$ and $f_2$; respectively;
   a circular waveguide connected to said antenna and including a rotatable 90° phase shifter and a rotatable 180° phase shifter connected in series;
   means connected to receive the output of said rotatable 180° phase shifter for producing the vertical polarized signal at one of its outputs and for producing the horizontally polarized signal at its other output;
   a first $f_1$ bandpass filter connected to receive the vertical polarized signals from the last mentioned means and a second $f_1$ bandpass filter connected to receive the horizontal polarized signals from the last mentioned means;
   a 90° phase shifter for shifting the output from said first $f_1$ bandpass filter;
   a first multiplier means for multiplying the signals from the 90° phase shifter with the signal from said second $f_1$ bandpass filter;
   a first motor means receiving the output signals from said first multiplier means for controlling said rotatable 90° phase shifter;
   a second multiplier means for multiplying the signals from said first $f_1$ bandpass filter with the signal from said second $f_1$ bandpass filter; second motor means receiving the output signals from said second multiplier means for controlling said rotatable 180° phase shifter;
   a first two mechanically ganged variable directional couplers connected together electrically for cancelling the inphase crosstalk between the vertical and horizontal polarized signals before they are applied to said first and second $f_1$ bandpass filters; and
   a second two mechanically ganged variable directional couplers connected together electrically through a second 90° phase shifter for cancelling the quadrature crosstalk between the polarized signals before they are applied to said first and second $f_1$ bandpass filters.

2. A broadband adaptively controlled polarization separation network according to claim 1 including:
   a first $f_2$ bandpass filter connected to receive the vertical polarized signals after they have passed the first and second two mechanically ganged variable directional couplers and a second $f_2$ bandpass filter connected to receive the horizontal polarized signals after they have passed the first and second two mechanically ganged variable directional couplers;
   a third multiplier means for multiplying the signal from the first $f_2$ bandpass filter with the signals from the second $f_2$ bandpass filter; and
   a third motor means receiving the output signals from said third multiplier means for controlling said first two mechanically ganged variable directional couplers.

3. A broadband adaptively controlled polarization separation network according to claim 2 including:
a third 90° phase shifter for shifting the output from said first $f_2$ bandpass filter;
a further multiplier means for multiplying the signal from the third 90° phase shifter with the signal from the second $f_2$ bandpass filter; and
a fourth motor means receiving the output signal from said fourth multiplier means for controlling said second two mechanically ganged variable directional couplers.

* * * * *